C. W. THOMAS.
METHOD OF MAKING A VITRIFIED PRODUCT.
APPLICATION FILED FEB. 9, 1915.
1,185,555.  Patented May 30, 1916.
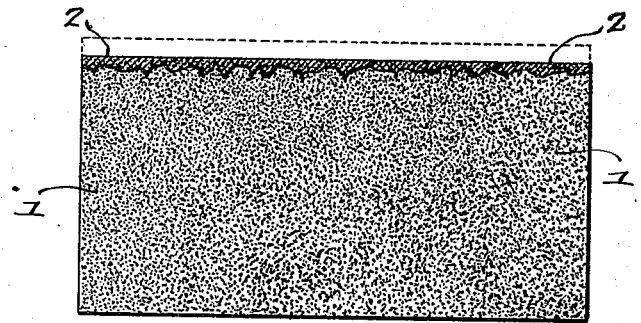
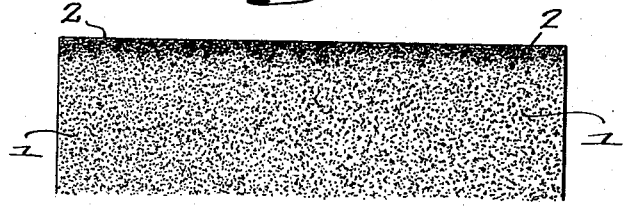
Witnesses —
Charles H. York.
Hill A. Simons.
Inventor
Charles W. Thomas.
by his Attorneys —
Howson + Howson

UNITED STATES PATENT OFFICE.

CHARLES W. THOMAS, OF EAST DOWNINGTOWN, PENNSYLVANIA, ASSIGNOR TO WHITE HEAT PRODUCTS COMPANY, OF WEST CHESTER, PENNSYLVANIA, A CORPORATION OF PENNSYLVANIA.

METHOD OF MAKING A VITRIFIED PRODUCT.

1,185,555.        Specification of Letters Patent.      Patented May 30, 1916.

Application filed February 9, 1915.. Serial No. 7,044.

*To all whom it may concern:*

Be it known that I, CHARLES W. THOMAS, a citizen of the United States, and a resident of East Downingtown, Chester county, Pennsylvania, have invented a Method of Making a Vitrified Product, of which the following is a specification.

One object of my invention is to provide vitrified objects such as bricks which shall possess a novel structure and qualities, the invention also contemplating a process whereby such objects may be made.

A further object of the invention is to provide a process whereby a surface filler may be so applied to objects of vitrifiable material that unlike a veneer or glaze it will not scale off from the effects of the weather and will cause one or more of the faces of the object to be impervious to moisture as well as possess a highly ornamental appearance.

These objects and other advantageous ends I secure as hereinafter set forth, reference being had to the accompanying drawings, in which, Figure 1 is a fragmentary section of a brick made according to my invention, and, Fig. 2 is a fragmentary section illustrating a slightly different form of brick also made in accordance with my invention.

In carrying out the invention a clot of vitrifiable material consisting for example of a mixture of 64 parts silica, 3 parts alumina and 33 parts glass culet is dipped in a liquid solution or mixture consisting of a vitrifiable surface filler, it being understood that usually one end and one face of the clot are treated or impregnated with this substance. The clot and the filler such as a suitable silicate held in suspension in water upon it are then heated to such a temperature (between 1500° and 2300° F.) that the clot becomes plastic and somewhat porous, while the filler is viscous or semifluid. Thereafter while still hot-plastic the clot is subjected by suitable means to pressure in an ordinary brick re-pressing machine of the Chambers type for example, so that while its body as a whole is more or less compressed, the filler is forced or injected into the surface thereof to which it is applied, causing said body to become the matrix for the relatively more fluid filler which is forced into and is interlocked with it. The otherwise finished block is thus annealed in the ordinary manner.

In the drawing I have illustrated a portion of a brick or other object 1 of vitreous material which after being dipped in the filler or having the latter applied to it, has a coating 2 of varying thickness upon more or less of its surface. After the clot and filler have been heated to plasticity and subjected to suitable pressure, said filler is not only forced into the pores of the adjacent face of the body 1, but in addition it is to a greater or less extent interlocked with the material of said body, entering overhung and other forms of recesses therein while having a smooth outer face. In any case, however, the filler provides an effective water proof surface for the brick and cannot by any possibility scale off even when subjected to the most severe conditions due to extremes of temperature. Moreover the brick cannot be injured by moisture and subsequent freezing since water cannot penetrate through the exterior coating on the exposed or wearing face.

It is to be understood that without departing from my invention the surface filler may be completely injected into the relatively porous surface of the brick or on the other hand may be but partially injected, in which case it would form a vitrified face mechanically tied into the body of the brick.

I claim:—

The method which consists in applying a vitrifiable filler to a clot; heating said clot with the filler to plasticity; and thereafter compressing the clot and filler to cause interlocking of the filler with the adjacent portion of the clot.

In testimony whereof, I have signed my name to this specification, in the presence of two subscribing witnesses.

CHARLES W. THOMAS.

Witnesses:
WILLIAM E. BRADLEY,
WM. A. BARR.

Copies of this patent may be obtained for five cents each, by addressing the "Commissioner of Patents Washington, D. C."